United States Patent
Amitay et al.

(10) Patent No.: US 7,269,787 B2
(45) Date of Patent: Sep. 11, 2007

(54) MULTI-DOCUMENT CONTEXT AWARE ANNOTATION SYSTEM

(75) Inventors: Einat Amitay, Kibbutz Shaar HaGolan (IL); Michal Jacovi, Rakefet (IL); Amnon Ribak, Misgav (IL); Vladimir Soroka, Carmiel (IL); Sigalit Ur, Misgav (IL)

(73) Assignee: International Business Machines Coporation, Armonk, NY (US)

( * ) Notice: Subject to any disclaimer, the term of this patent is extended or adjusted under 35 U.S.C. 154(b) by 501 days.

(21) Appl. No.: 10/425,065

(22) Filed: Apr. 28, 2003

(65) Prior Publication Data

US 2004/0216032 A1    Oct. 28, 2004

(51) Int. Cl.
*G06F 17/00* (2006.01)

(52) U.S. Cl. .................... 715/512; 345/173; 707/100

(58) Field of Classification Search ........... 715/512, 715/500, 864; 345/173, 864; 707/100
See application file for complete search history.

(56) References Cited

U.S. PATENT DOCUMENTS

| | | | | |
|---|---|---|---|---|
| 4,984,162 A * | 1/1991 | Torii et al. | ................... | 715/530 |
| 5,347,625 A * | 9/1994 | Kajimoto et al. | ........... | 715/539 |
| 5,513,305 A * | 4/1996 | Maghbouleh | ............... | 715/500 |
| 5,708,806 A * | 1/1998 | DeRose et al. | .......... | 707/104.1 |
| 5,822,539 A * | 10/1998 | van Hoff | ..................... | 709/236 |
| 5,845,301 A * | 12/1998 | Rivette et al. | ............... | 715/512 |
| 5,860,074 A * | 1/1999 | Rowe et al. | ................. | 715/526 |
| 5,893,132 A * | 4/1999 | Huffman et al. | ............ | 715/532 |
| 5,956,034 A * | 9/1999 | Sachs et al. | ................. | 715/776 |
| 6,073,148 A * | 6/2000 | Rowe et al. | ................. | 715/542 |
| 6,105,044 A * | 8/2000 | DeRose et al. | ............. | 715/514 |
| 6,279,017 B1 * | 8/2001 | Walker | ...................... | 715/529 |
| 6,331,865 B1 * | 12/2001 | Sachs et al. | ................. | 715/776 |
| 6,331,867 B1 * | 12/2001 | Eberhard et al. | ........... | 715/864 |
| 6,342,906 B1 * | 1/2002 | Kumar et al. | ............... | 715/751 |
| 6,356,287 B1 * | 3/2002 | Ruberry et al. | ............. | 715/864 |
| 6,369,811 B1 * | 4/2002 | Graham et al. | ............. | 715/764 |
| 6,389,434 B1 * | 5/2002 | Rivette et al. | ............... | 715/512 |
| 6,546,405 B2 * | 4/2003 | Gupta et al. | ................. | 715/512 |
| 6,687,876 B1 * | 2/2004 | Schilit et al. | ................ | 715/512 |
| 6,714,214 B1 * | 3/2004 | DeMello et al. | ............ | 715/711 |
| 6,859,909 B1 * | 2/2005 | Lerner et al. | ................ | 715/512 |
| 6,877,137 B1 * | 4/2005 | Rivette et al. | ............... | 715/512 |
| 6,891,551 B2 * | 5/2005 | Keely et al. | ................. | 715/762 |
| 6,973,616 B1 * | 12/2005 | Cottrille et al. | ............. | 715/512 |
| 2002/0054059 A1 * | 5/2002 | Schneiderman | ............. | 345/700 |

(Continued)

OTHER PUBLICATIONS

J. Kahan, M. Koivunen, E. Prud'Hommeaux, and R. Swick. Annotea: An Open RDF Infrastructure for Shared Web Annotations. In Proc. of the WWW10 International Conference. Hong Kong, May 2001. <http://citeseer.ist.psu.edu/kahan01annotea.html>.*

*Primary Examiner*—Doug Hutton
*Assistant Examiner*—James H Blackwell (57) ABSTRACT

A method for document annotation includes providing a contextual framework extending over multiple electronic documents. Annotations are input to a computer by a user with respect to two or more of the documents, while the user views the documents on a computer screen. Each of the annotations is stored together with respective context information in a memory of the computer, the context information including multiple fields defined by the framework. The annotations are sorted with respect to the two or more documents according to one or more of the multiple fields of the respective context information, and the sorted annotations are output for viewing by the user.

51 Claims, 4 Drawing Sheets

U.S. PATENT DOCUMENTS

| | | | |
|---|---|---|---|
| 2002/0055955 A1* | 5/2002 | Lloyd-Jones et al. | 707/512 |
| 2002/0059342 A1* | 5/2002 | Gupta et al. | 707/512 |
| 2002/0129057 A1* | 9/2002 | Spielberg | 707/512 |
| 2003/0090473 A1* | 5/2003 | Joshi | 345/173 |
| 2004/0064455 A1* | 4/2004 | Rosenzweig et al. | 707/100 |
| 2004/0078757 A1* | 4/2004 | Golovchinsky et al. | 715/512 |
| 2004/0194021 A1* | 9/2004 | Marshall et al. | 715/512 |
| 2004/0201633 A1* | 10/2004 | Barsness et al. | 345/864 |
| 2004/0205541 A1* | 10/2004 | D'Amico | 715/512 |
| 2004/0205542 A1* | 10/2004 | Bargeron et al. | 715/512 |
| 2004/0205545 A1* | 10/2004 | Bargeron et al. | 715/512 |

\* cited by examiner

```
GENERAL MEETING AGENDA
DATE: 21/5/01  TIME: 12:00-14:00
TOPIC 1
PRESENTER: X
DESCRIPTION : ~~~~~~~~~~
NOTES ABOUT TOPIC 1 (GENERAL MEETING AGENDA SCREEN)
    12:15 ~~~~~~~~~~
    13:44 ~~~~~~~~~~

ATTACHMENT 1, FILE NAME: REVIEW.PPT
    NOTES ABOUT ATTACHMENT 1 "TITLED XYZ"
    12:30 SLIDE 1 ~~~~~~~~
    12:40 SLIDE 5 ~~~~~~~~
    12:43 SLIDE 1 ~~~~~~~~

ATTACHMENT 2, FILE NAME: WHITE_PAPER.PDF
    NOTES ABOUT ATTACHMENT 2 "TITLED ABC"
    13:00 PAGE 2 (SEE IMAGE) ~~~~~~~~
    13:40 PAGE 7 ~~~~~~~~
    13:46 PAGE 1 ~~~~~~~~

TOPIC 2
PRESENTER: Y
DESCRIPTION : ~~~~~~~~~~
NOTES ABOUT TOPIC 2 :
    13:50 ~~~~~~~~
    13:59 ~~~~~~~~
```

80

MULTI-DOCUMENT CONTEXT AWARE ANNOTATION SYSTEM

FIELD OF THE INVENTION

The present invention relates generally to processing and display of electronic media, and specifically to methods for electronic document annotation.

BACKGROUND OF THE INVENTION

Note-taking is a common task in work and study environments. People jot down ideas on scraps of paper to make sure they are not forgotten. They annotate printouts of documents during meetings, and they write on presentation printouts during classes.

A similar paradigm has made its way into electronic media, wherein computer users annotate and comment on electronic documents and presentations that they view on screen. These annotations may be recorded electronically typically using annotation tools that are offered as part of some specific software applications, such as word processors, or using a separate document-editing application, such as an on-screen notepad or other text editor. (Of course, people still write notes on paper, as well, while viewing electronic documents and presentations.) When users are simultaneously faced with a variety of screens and documents, the task of taking notes and keeping track of them can become unwieldy. The user must often invest considerable effort downstream in organizing the notes into a useful form.

There are methods known in the art for organizing electronic annotations. For example, U.S. Pat. No. 5,146,552, whose disclosure is incorporated herein by reference, describes a method for associating annotations with electronically-published material. This method permits a reader of an electronic document to create notes, bookmarks and annotations, and to relate them to a particular location in the document. The record of the annotations can be stored within or separately from the document. When stored separately, the annotations are held in a file that is associated by name with the document and can either be accessed by a particular individual reader or shared between different readers. The annotations can be associated with a particular context within the document by exploiting the structure created by the writer of the document. This structure identifies major document elements, such as chapters, sections, sub-sections, paragraphs, figures, etc.

U.S. Pat. No. 5,822,539, whose disclosure is incorporated herein by reference, describes a system for adding cross-references to a document using an annotation proxy and annotation server. The annotation proxy is a software procedure configured to merge a requested document from a first server with hypertext links to documents containing associated supplemental information. The annotation proxy can generate a dictionary of references to documents requested by a user. Each reference in the dictionary indicates the textual context of the hypertext link or links used to request the associated document.

SUMMARY OF THE INVENTION

The present invention provides methods and systems that enable users to organize their annotations coherently and to review the annotations easily, even when the annotations extend over multiple, different electronic documents and multiple different screens.

In embodiments of the present invention, users record annotations electronically, using a keyboard or other input device, while viewing electronic documents on a computer screen. The computer stores the user annotations in a data structure, such as a database, along with context information for each annotation, based on a unified contextual framework that extends over multiple electronic documents. The context information for each annotation typically includes, inter alia, the application type and file name of the annotated document, topic and author of the document, and the location in the document and time of the annotation. However, the framework and data structure are independent of the applications that are used to create and display the documents.

The methods of the present invention thus allow annotations made on different types of documents (such as text documents, presentation slides and images) to be collected together in the database in a unified format. The context information can then be used to sort and display the annotations in different views, according to the time they were recorded, for example, or the subject. In this way, the user is able to review his or her annotations and share them with other users in the most logical and convenient manner, even when the annotations cover multiple different documents, created by different applications.

There is therefore provided, in accordance with an embodiment of the present invention, a method for document annotation, including:

providing a contextual framework extending over multiple electronic documents;

receiving annotations input to a computer by a user with respect to two or more of the documents, while the user views the documents on a computer screen;

storing each of the annotations together with respective context information in a memory of the computer, the context information including multiple fields defined by the framework;

sorting the annotations with respect to the two or more documents according to one or more of the multiple fields of the respective context information; and outputting the sorted annotations for viewing by the user.

Typically, receiving the annotations includes receiving first annotations with respect to a first document, which is viewed by the user using a first software application on the computer, and receiving second annotations with respect to a second document, which is viewed by the user using a second software application on the computer, wherein the contextual framework extends over at least the first and second software applications. In an aspect of the invention, storing each of the annotations includes storing the first and second annotations together in a data structure that is substantially independent of the first and second applications. The data structure may be a database including the multiple fields.

Additionally or alternatively, storing each of the annotations includes storing, together with each of at least some of the annotations, an image of at least a portion of the computer screen viewed by the user while inputting the annotations, in an image format that is substantially independent of the first and second software applications, and outputting the stored annotations includes displaying the image. Further additionally or alternatively, outputting the sorted annotations includes creating a unified view of the annotations received with respect to both the first and second software applications.

In another aspect of the invention, receiving the annotations includes receiving an input from the user selecting one of the documents and indicating a location in the one of the documents at which one of the annotations is to be made, and the multiple fields of the context information include a file name of the one of the documents and the location. In an embodiment of the invention, receiving the annotations further includes, in response to the input, opening a window on the computer screen in which the user is to enter the one of the annotations. Additionally or alternatively, sorting the annotations includes sorting the annotations by the file name and location.

In a further aspect of the invention, storing each of the annotations includes storing the annotations with respective time stamps, and sorting the annotations includes sorting the annotations, responsively to the time stamps, according to an order in which the annotations were input by the user.

Typically, sorting the annotations includes selecting for output, responsively to the context information, a subset of the annotations indicated by the user.

In an embodiment of the invention, the method includes performing a free text search of the annotations received with respect to the two or more documents, and sorting the annotations responsively to the free text search.

In another embodiment, sorting the annotations includes merging the annotations created by multiple users into a single list, which is sorted according to the one or more of the multiple fields.

In a further embodiment, providing the contextual framework includes receiving an agenda of a conference at which the two or more of the documents are to be presented, and defining at least some of the multiple fields in the framework based on the agenda.

Optionally, storing each of the annotations includes prompting the user to input to the computer the context information to be stored in at least one of the multiple fields.

Typically, the multiple fields include one or more context fields selected from a group of the context fields consisting of a file name of one of the documents, a software application type of one of the documents, a topic of one of the documents, a title of one of the documents, an author or presenter of one of the documents, an annotation location in one of the documents, a time stamp, and an identification of the user.

There is also provided, in accordance with an embodiment of the present invention, apparatus for document annotation, including:
a workstation processor;
a memory;
a display, coupled to be driven by the workstation to display documents for viewing by a user; and
a user input device, which is coupled to receive annotations input by the user while viewing the documents on the display,
wherein the processor is arranged to provide a contextual framework extending over multiple electronic documents, such that upon receiving the annotations input by the user with respect to two or more of the documents, the processor stores each of the annotations in the memory together with respective context information including multiple fields defined by the framework, the processor being further arranged to sort the annotations with respect to the two or more documents according to one or more of the multiple fields of the respective context information, and to output the sorted annotations for viewing by the user.

There is additionally provided, in accordance with an embodiment of the present invention, a computer software product, including a computer-readable medium in which program instructions are stored, which instructions, when read by a computer, cause the computer to provide a contextual framework extending over multiple electronic documents, to receive annotations input to the computer by a user with respect to two or more of the documents, while the user views the documents on a computer screen and to store each of the annotations together with respective context information in a memory of the computer, the context information including multiple fields defined by the framework, wherein the instructions further cause the computer to sort the annotations with respect to the two or more documents according to one or more of the multiple fields of the respective context information, and to output the sorted annotations for viewing by the user.

The present invention will be more fully understood from the following detailed description of the embodiments thereof, taken together with the drawings in which:

DETAILED DESCRIPTION OF EMBODIMENTS

Figure 1:
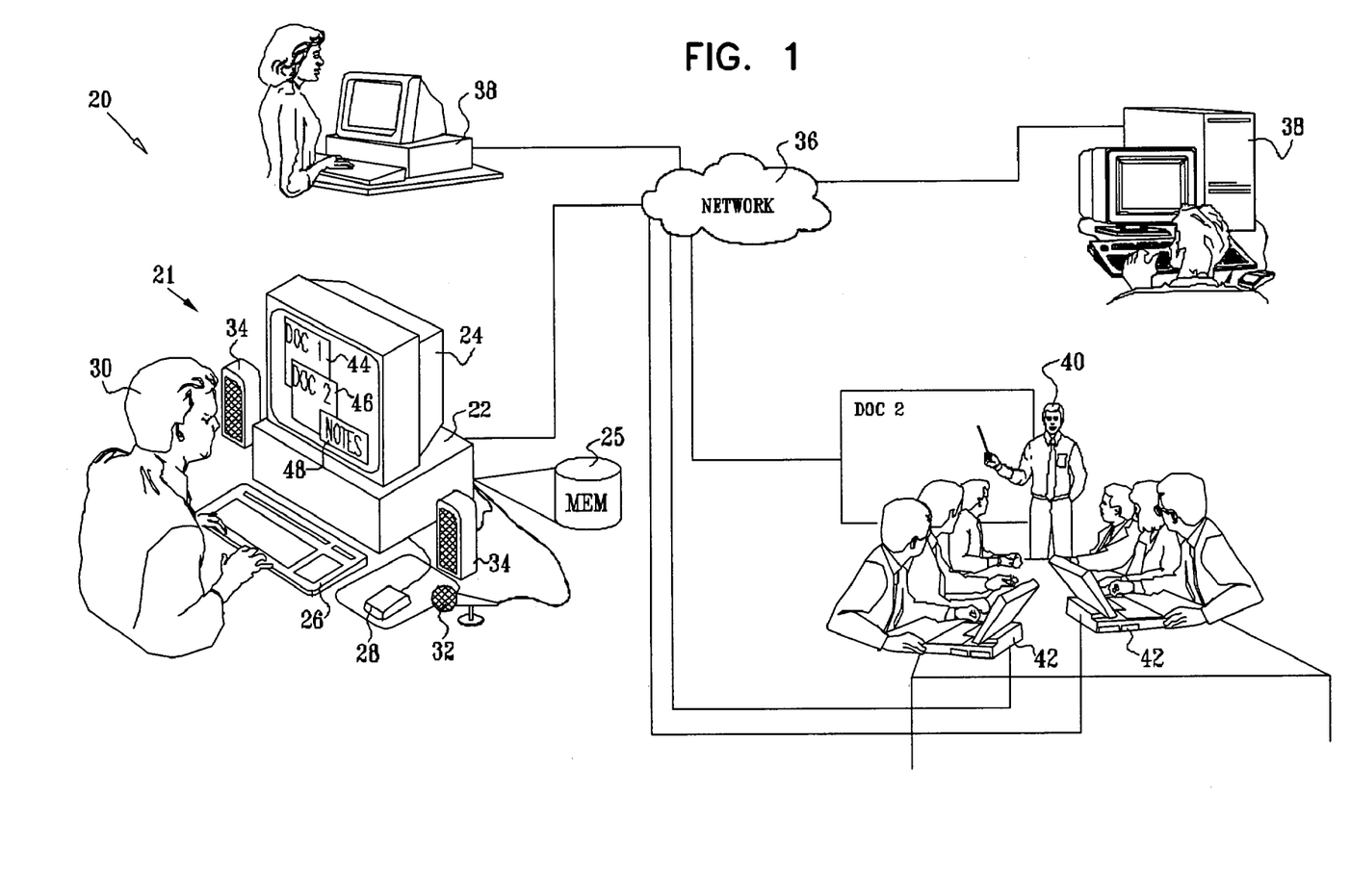
FIG. 1 is a schematic, pictorial view of a computerized system for document display and annotation, in accordance with an embodiment of the present invention.

FIG. 1 is a schematic, pictorial illustration of a system 20 for document display and annotation, in accordance with an embodiment of the present invention. System 20 is built around a workstation 21, typically a personal computer with novel software for document annotation, as described hereinbelow. This software may be downloaded to workstation 21 in electronic form, or it may alternatively be provided on tangible media, such as CD-ROM. Workstation 21 comprises a processor 22, a display 24 and a memory 25, as well as user input devices, such as a keyboard 26 and a mouse 28, for operation by a user 30. Typically, the workstation may also comprise other input and output devices, including audio devices such as a microphone 32 and a speaker 34.

In the present embodiment, workstation 21 is shown in the context of a teleconferencing or distance learning environment. The workstation is connected via a network 36, along with other, similar workstations 38, to observe a presentation made by a presenter 40. Other participants may use workstations 42 or terminals that are collocated with the presenter. Some or all of these workstations may have the annotation capabilities described below with reference to workstation 21. Alternatively, user 30 may view and annotate documents on display 24 in a standalone mode, independently of any conference or remote connections of workstation 21.

A variety of documents 44 and 46 are shown on display 24. These documents may be created and viewed using different applications. For example, document 44 may be a text document created by a word processing program, while document 46 (which presenter 40 is in the course of explaining) may be a presentation slide. The term "document," as used in the present patent application and in the claims, is to be understood broadly as referring to any and all sorts of electronic content that may be contained in a computer file and shown on a computer display. Substantially any application may be used to create and display the documents, including, inter alia, applications for word processing, presentation, spreadsheet computations, electronic publishing, Web browsing, electronic mail, imaging and animation. "Documents" in this context may also be generated by means other than computer applications, for example, images that are output by electronic whiteboards or other handwriting capture devices, and freeze-frame video images.

When user 30 wishes to add an annotation to a document on display 24, an annotation box 48 opens on screen. Typically, the annotation box is a text box, in which the user can enter text using keyboard 26. Alternatively or additionally, box 48 may be capable of recording graphic inputs by the user, using mouse 28 or a tablet, for example. Workstation 21 may also accept annotation inputs in other media, such as voice annotations made through microphone 32. Various methods may be used to open annotation box 48. For example, the user may select a location in one of documents 44, 46 at which to add an annotation by clicking on the location with mouse 28. Additionally or alternatively, there may be an on-screen menu item for opening an annotation box, such as an item in the operating system menus of workstation 21. As a further alternative, the annotation box may be invoked by a certain combination of keystrokes on keyboard 26. Multiple annotation boxes may be opened simultaneously, to accept user annotations in different, respective contexts—for example, a separate annotation box for each of documents 44 and 46.

When user 30 records an annotation, the annotation is stored in memory 25 together with context information. Typically, the context information includes some or all of the following fields:

Time the annotation was recorded.
File name and application type of the annotated document.
Title of the document.
Location of the annotation in the document.
Author or person presenting the document.
Subject of the document and/or of the annotation.
Identity of the user creating the annotation.

Other fields that may be used will be apparent to those skilled in the art.

The context information is preferably created and stored in a structured, hierarchical format, using a system of XML tags, for example. The taxonomy of the context information (i.e., the types of fields and their hierarchy, as well as any other interrelations) may be defined in advance by the author of a document or by the moderator of an electronic meeting in which multiple documents are presented. Additionally or alternatively, some or all of the taxonomy may be generated automatically by workstation 21, using information that is already present in the documents to be annotated (such as the file names, application types, author, and section and page divisions within documents) or available from the workstation operating system (such as the time, date and user name). The taxonomy may also be created by the user who is recording the annotations. If an existing or computer-defined taxonomy is used, it may be augmented by the user both before the annotation session and interactively, during the session.

Figure 2:
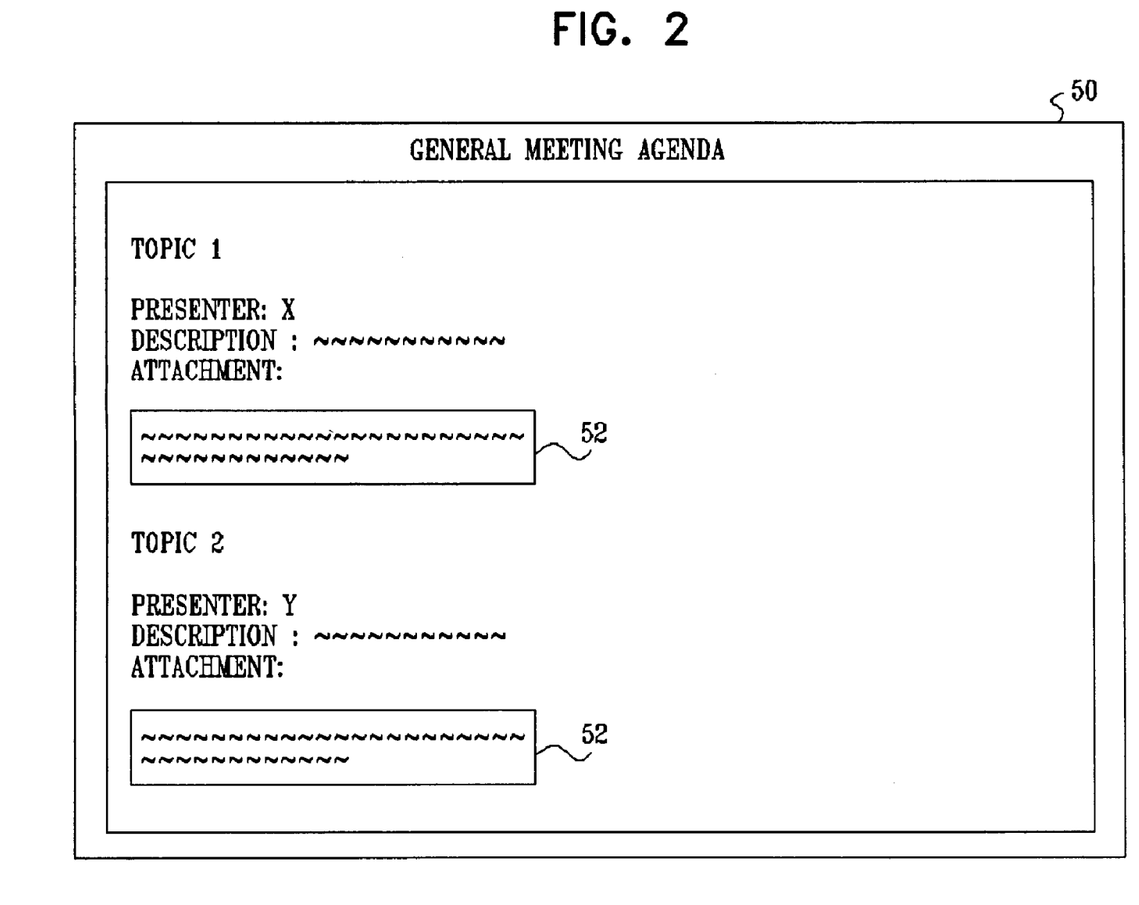
FIG. 2 is a schematic representation of a computer screen showing an agenda for a conference in which electronic documents are to be displayed.

FIG. 2 is a schematic representation of a screen 50 appearing on display 24, illustrating a method for structuring context information in accordance with an embodiment of the present invention. In the present example, screen 50 shows the agenda of an on-line conference, such as the type of meeting illustrated by FIG. 1. A moderator of the meeting creates an agenda, which may be written in XML and then parsed by the annotation software or another suitable program on computer 21 to create screen 50. The agenda includes the following fields:

1. Topics for discussion.
2. Presenter name for each topic.
3. Further descriptive meta-information on each presentation.
4. Links to files that are to be presented (represented in the figure by boxes 52 on screen 50).

Other agenda fields may be added, as will be apparent to those skilled in the art.

The agenda shown on screen 50 provides the basic taxonomy of context information for the annotations recorded by user 30 and other participants in the meeting. As noted above, this taxonomy may be augmented with context meta-information derived from the documents themselves, such as page and section numbers, and from the workstation operating system, as well as additional information that may be added by the user.

Figure 3:
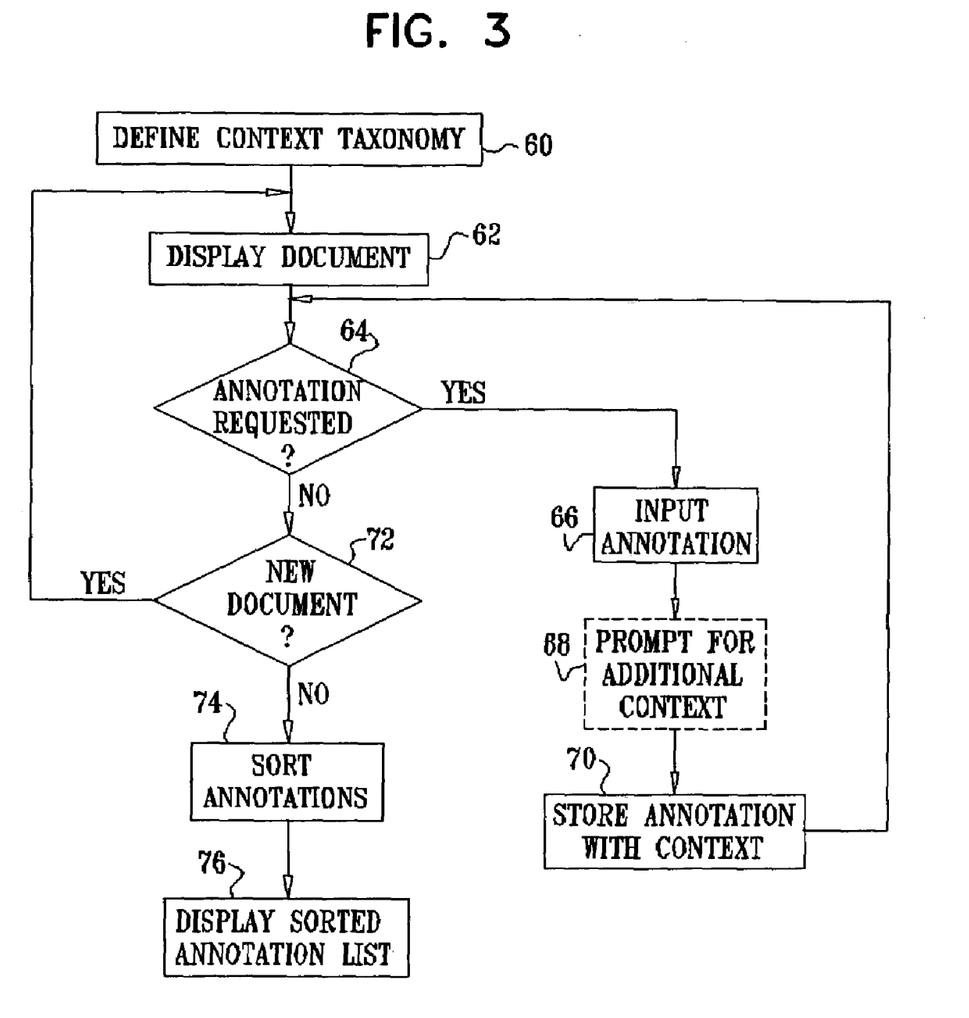
FIG. 3 is a flow chart that schematically illustrates a method for recording and storing annotations, in accordance with an embodiment of the present invention.

FIG. 3 is a flow chart that schematically illustrates a method for recording and storing annotations, in accordance with an embodiment of the present invention. Before beginning to record annotations, a taxonomy of context information is defined, as described above, in a context definition step 60. As noted earlier, the context may be defined, for example, by a meeting organizer or document author, by the user recording the annotations, automatically by a computer, or by combining elements provided by two or more of these contributors. The initial document to be reviewed by user 30 is then shown on display 24, at a document display step 62.

User 30 initiates recording of an annotation, at an annotation request step 64, typically by a mouse click or keyboard entry, as described above. At this point, annotation window 48 opens, allowing user 30 to record an annotation, at an annotation input step 66. Workstation 21 may optionally prompt the user to input additional context information, at a context addition step 68. The additional information may be selected from an on-screen list presented by the computer, for example, or it may alternatively be entered by the user as free text. The computer may prompt for and receive the additional information before, after or while the user is inputting the annotation text itself.

When the user is finished recording an annotation, the user indicates that the annotation is complete, by pressing the "Enter" key or clicking on a "Done" button, for example. Workstation 21 then records the annotation in memory 25, at an annotation storage step 70. The annotation is stored in a data structure, such as a database, together with the fields identifying its context, as noted above. Certain context fields, such as the time stamp, application type and user name, may be provided by the workstation operating system. Others are provided by the application used to create and display the document and by the document itself. Still other context fields may be culled from an agenda, as shown in FIG. 2, or from an outline or syllabus supplied by the presenter or organizer of a meeting or lesson.

Along with each annotation (or with certain annotations selected by the user), workstation 21 may also store the contents of the window, such as window 46, to which the annotation relates. The window contents are typically stored in the form of a "snapshot" of the window contents, such as a particular page or section of the document that the user was viewing when he or she recorded the annotation. The snapshot may take the form of an image of the document window, independent of the application that actually created the window contents, for example, a GIF, JPEG or PDF image of the window. Alternatively, the window contents may be stored in an application-dependent format. In either case, when reviewing the annotations thereafter, the user can recall and review the window contents to which each annotation related alongside the annotation itself.

Steps 62 through 70 are repeated for each document that user 30 views in the course of a meeting or other work session, at a new document step 72. All the annotations are stored in the common data structure in memory 25, based on the context taxonomy defined at step 60 and (optionally) augmented at step 68, independently of the applications used to create and view the documents themselves.

User 30 may instruct workstation 21 to sort the annotations in memory 25 for review, at an annotation sorting step 74. This sorting step typically takes place after the annotation session is finished, for example, after the end of a meeting. Alternatively, this step may be invoked by the user while the annotation session is still in progress, in order to review, edit or delete annotations that have been collected, or to search for a particular annotation. The user may select substantially any field or cross-section of fields on which to sort and view the annotations in the database, for example:

View annotations in time order.

View annotations recorded during a specified time interval.

View annotations by presenter.

View annotations relating to a particular topic.

View annotations in sequential order within a document.

View annotations relating to a particular section of a selected document.

Other sorting options and alternative data views will be apparent to those skilled in the art. For example, the user may choose to view annotations sorted and/or ranked according to a free text search of the annotation contents.

Workstation 21 displays the sorted list of annotations, at an annotation display step 76. Each annotation typically comprises a link to the document to which the annotation relates, preferably a link to the specific location in the document at which the annotation was recorded. This link may be used to view the document while reading the annotation. Alternatively or additionally, the screen snapshots associated with the annotation may be viewed in application-independent form. The user may share the annotation list with other users. Furthermore, workstation 21 or an annotation server (not shown) may merge the annotations created by multiple users into a single, sorted list or other view.

Figure 4:
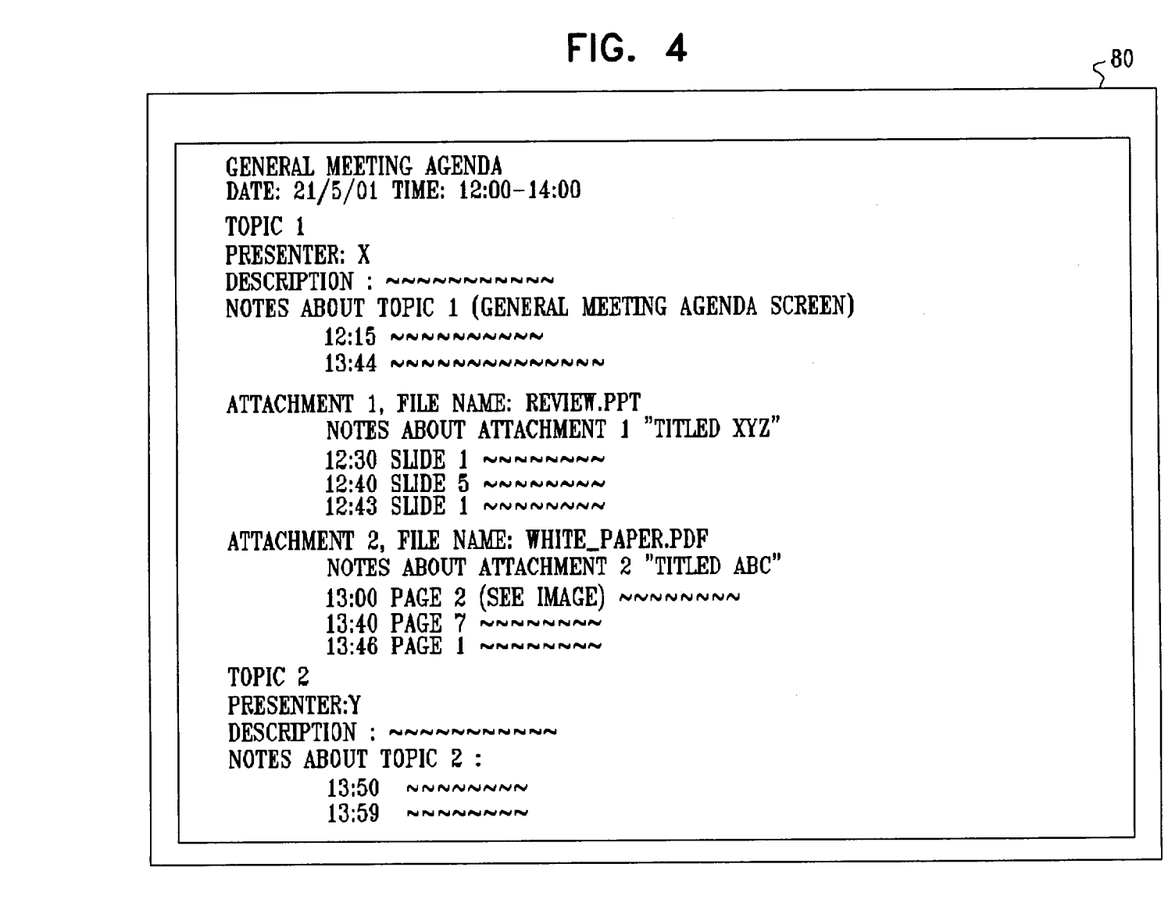
FIG. 4 is a schematic representation of a computer screen showing a unified view of annotations recorded on different documents, in accordance with an embodiment of the present invention.

FIG. 4 is a schematic representation of a screen 80 appearing on display 24, showing a sorted view of annotations made on multiple documents, in accordance with an embodiment of the present invention. In this example, while viewing a Microsoft PowerPoint® presentation (REVIEW.PPT) presented by "X", the user inserted several comments about different slides. Then, the user read an Adobe Acrobat® PDF file (WHITE_PAPER.PDF, which was also presented by "X") in another window and added some comments there. The comment regarding page 2 of the PDF file was stored together with an image of the page. The user then viewed a presentation by "Y" and recorded some further annotations on another document.

Workstation 21 stored the annotations with their context, and then produced screen 80, showing a list of the annotations, ordered by topic, document and time. From the PowerPoint document, workstation 21 extracted the title of the presentation and the specific places and order in which the user's notes were inserted. Next, the notes on the PDF document were added to the list, together with the title of the document (and possibly other information, as well, such as the document authors, which does not appear on screen 80). To create screen 80, workstation 21 extracts the required information from the log of the user's actions and from details provided by the moderator of the meeting and by composers and presenters of the documents.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for document annotation, comprising:

providing a contextual framework extending over multiple electronic documents and multiple software applications, wherein the framework is independent of the software applications that are used to create and view the documents;

receiving annotations input to a computer by a user with respect to two or more of the documents, while the user views the documents on a computer screen, the two or more of the documents comprising at least a first document that is viewed by the user using a first software application on the computer, and a second document that is viewed by the user using a second software application on the computer, the annotations comprising an input from the user selecting at least one of the documents and indicating a location in the at least one of the documents at which at least one of the annotations is to be made;

storing each of the annotations together with respective context information in a memory of the computer, the context information comprising multiple fields defined by the framework, the fields comprising a file name of the at least one of the documents and the location indicated by the user in the at least one of the documents;

sorting the annotations with respect to the two or more documents according to one or more of the multiple fields of the respective context information; and outputting the sorted annotations for viewing by the user in an annotation listing comprising user-operable links from the annotations to the documents with respect to which the annotations were received.

2. The method according to claim 1, wherein storing each of the annotations comprises storing the annotations with respect to both the first and second documents together in a data structure that is substantially independent of the first and second applications.

3. The method according to claim 2, wherein the data structure is a database comprising the multiple fields.

4. The method according to claim 1, wherein storing each of the annotations comprises storing, together with each of at least some of the annotations, an image of at least a portion of the computer screen viewed by the user while inputting the annotations, in an image format that is substantially independent of the first and second software applications, and wherein outputting the stored annotations comprises displaying the image.

5. The method according to claim 1, wherein outputting the sorted annotations comprises creating a unified view of the annotations received with respect to both the first and second software applications.

6. The method according to claim 1, wherein receiving the annotations further comprises, in response to the input, opening a window on the computer screen in which the user is to enter the one of the annotations.

7. The method according to claim 1, wherein sorting the annotations comprises sorting the annotations by the file name and location.

8. The method according to claim 1, wherein storing each of the annotations comprises storing the annotations with respective time stamps.

9. The method according to claim 8, wherein sorting the annotations comprises sorting the annotations, responsively to the time stamps, according to an order in which the annotations were input by the user.

10. The method according to claim 1, wherein sorting the annotations comprises selecting for output, responsively to the context information, a subset of the annotations indicated by the user.

11. The method according to claim 1, and comprising performing a free text search of the annotations received with respect to the two or more documents, and sorting the annotations responsively to the free text search.

12. The method according to claim 1, wherein sorting the annotations comprises merging the annotations created by multiple users into a single list, which is sorted according to the one or more of the multiple fields.

13. The method according to claim 1, wherein providing the contextual framework comprises receiving an agenda of a conference at which the two or more of the documents are to be presented, and defining at least some of the multiple fields in the framework based on the agenda.

14. The method according to claim 1, wherein storing each of the annotations comprises prompting the user to input to the computer the context information to be stored in at least one of the multiple fields.

15. The method according to claim 1, wherein the multiple fields comprise one or more context fields selected from a group of the context fields consisting of a file name of one of the documents, a software application type of one of the documents, a topic of one of the documents, a title of one of the documents, an author or presenter of one of the documents, an annotation location in one of the documents, a time stamp, and an identification of the user.

16. The method according to claim 1, wherein the links connect to the location in the at least one of the documents at which the at least one of the annotations was made.

17. The method according to claim 1, wherein outputting the sorted annotations comprises outputting the annotation listing without outputting the documents with respect to which the annotations were received.

18. Apparatus for document annotation, comprising:
   a workstation processor;
   a memory;
   a display, coupled to be driven by the workstation to display documents for viewing by a user; and
   a user input device, which is coupled to receive annotations input by the user while viewing two or more of the documents on the display, the two or more of the documents comprising at least a first document that is viewed by the user using a first software application on the computer, and a second document that is viewed by the user using a second software application on the computer, the annotations comprising an input from the user selecting at least one of the documents and indicating a location in the at least one of the documents at which at least one of the annotations is to be made,
   wherein the processor is arranged to provide a contextual framework extending over multiple electronic documents and multiple software applications, wherein the framework is independent of the software applications that are used to create and view the documents, such that upon receiving the annotations input by the user with respect to the two or more of the documents, the processor stores each of the annotations in the memory together with respective context information comprising multiple fields defined by the framework, the fields comprising a file name of the at least one of the documents and the location indicated by the user in the at least one of the documents, the processor being further arranged to sort the annotations with respect to the two or more of the documents according to one or more of the multiple fields of the respective context information, and to output the sorted annotations for viewing by the user in an annotation listing comprising user operable links from the annotations to the documents with respect to which the annotations were received.

19. The apparatus according to claim 18, wherein the processor is arranged to store the annotations with respect to both the first and second documents together in a data structure that is substantially independent of the first and second applications.

20. The apparatus according to claim 19, wherein the data structure is a database comprising the multiple fields.

21. The apparatus according to claim 18, wherein the processor is adapted to store, together with each of at least some of the annotations, an image of at least a portion of a computer screen viewed by the user on the display while inputting the annotations, in an image format that is substantially independent of the first and second software applications, and to display the image while outputting the stored annotations.

22. The apparatus according to claim 18, wherein the processor is adapted to create a unified view of the annotations received with respect to both the first and second software applications.

23. The apparatus according to claim 18, wherein the processor is arranged, in response to the input, to open a window on the display in which the user is to enter the one of the annotations.

24. The apparatus according to claim 18, wherein the processor is arranged to sort the annotations by the file name and location.

25. The apparatus according to claim 18, wherein the processor is arranged to store the annotations with respective time stamps.

26. The apparatus according to claim 25, wherein the processor is arranged to sort the annotations, responsively to the time stamps, according to an order in which the annotations were input by the user.

27. The apparatus according to claim 18, wherein the processor is arranged to output, responsively to the context information, a subset of the annotations selected by the user.

28. The apparatus according to claim 18, wherein the processor is arranged to perform a free text search of the annotations received with respect to the two or more documents, and to sort the annotations responsively to the free text search.

29. The apparatus according to claim 18, wherein the processor is arranged to merge the annotations created by multiple users into a single list, which is sorted according to the one or more of the multiple fields.

30. The apparatus according to claim 18, wherein the processor is arranged to receive an agenda of a conference at which the two or more of the documents are to be presented, and to define at least some of the multiple fields in the framework based on the agenda.

31. The apparatus according to claim 18, wherein the processor is arranged to prompt the user to input to the computer the context information to be stored in at least one of the multiple fields.

32. The apparatus according to claim 18, wherein the multiple fields comprise one or more context fields selected from a group of the context fields consisting of a file name of one of the documents, a software application type of one of the documents, a topic of one of the documents, a title of one of the documents, an author or presenter of one of the documents, an annotation location in one of the documents, a time stamp, and an identification of the user.

33. The apparatus according to claim 18, wherein the links connect to the location in the at least one of the documents at which the at least one of the annotations was made.

34. The apparatus according to claim 18, wherein the processor is arranged to output the annotation listing without outputting the documents with respect to which the annotations were received.

35. A computer software product, comprising a computer readable medium in which program instructions are stored, which instructions, when read by a computer, cause the computer to provide a contextual framework extending over multiple electronic documents and multiple software applications, wherein the framework is independent of the software applications that are used to create and view the documents, and further cause the computer to receive annotations input to the computer by a user with respect to two or more of the documents, while the user views the documents on a computer screen, the annotations comprising an input from the user selecting at least one of the documents and indicating a location in the at least one of the documents at which at least one of the annotations is to be made, the two or more of the documents comprising at least a first document that is viewed by the user using a first software application on the computer, and a second document that is viewed by the user using a second software application on the computer, and to store each of the annotations together with respective context information in a memory of the computer, the context information comprising multiple fields defined by the framework, the fields comprising a file name of the at least one of the documents and the location indicated by the user in the at least one of the documents, wherein the instructions further cause the computer to sort the annotations with respect to the two or more documents according to one or more of the multiple fields of the respective context information, and to output the sorted annotations for viewing by the user in an annotation listing comprising user-operable links from the annotations to the documents with respect to which the annotations were received.

36. The product according to claim 35, wherein the instructions cause the computer to store the annotations with respect to both the first and second documents together in a data structure that is substantially independent of the first and second applications.

37. The product according to claim 36, wherein the data structure is a database comprising the multiple fields.

38. The product according to claim 35, wherein the instructions cause the computer to store, together with each of at least some of the annotations, an image of at least a portion of the computer screen viewed by the user while inputting the annotations, in an image format that is substantially independent of the first and second software applications, and to display the image while outputting the stored annotations.

39. The product according to claim 35, wherein the instructions cause the computer to create a unified view of the annotations received with respect to both the first and second software applications.

40. The product according to claim 35, wherein the instructions cause the computer, in response to the input, to open a window on the computer screen in which the user is to enter the one of the annotations.

41. The product according to claim 35, wherein the instructions cause the computer to sort the annotations by the file name and location.

42. The product according to claim 35, wherein the instructions cause the computer to store the annotations with respective time stamps.

43. The product according to claim 42, wherein the instructions cause the computer to sort the annotations, responsively to the time stamps, according to an order in which the annotations were input by the user.

44. The product according to claim 35, wherein the instructions cause the computer to output, responsively to the context information, a subset of the annotations selected by the user.

45. The product according to claim 35, wherein the instructions cause the computer to perform a free text search of the annotations received with respect to the two or more documents, and to sort the annotations responsively to the free text search.

46. The product according to claim 35, wherein the instructions cause the computer to merge the annotations created by multiple users into a single list, which is sorted according to the one or more of the multiple fields.

47. The product according to claim 35, wherein the instructions cause the computer to receive an agenda of a conference at which the two or more of the documents are to be presented, and to define at least some of the multiple fields in the framework based on the agenda.

48. The product according to claim 35, wherein the instructions cause the computer to prompt the user to input to the computer the context information to be stored in at least one of the multiple fields.

49. The product according to claim 35, wherein the multiple fields comprise one or more context fields selected from a group of the context fields consisting of a file name of one of the documents, a software application type of one of the documents, a topic of one of the documents, a title of one of the documents, an author or presenter of one of the documents, an annotation location in one of the documents, a time stamp, and an identification of the user.

50. The product according to claim 35, wherein the links connect to the location in the at least one of the documents at which the at least one of the annotations was made.

51. The product according to claim 35, wherein the instructions cause the computer to output the annotation listing without outputting the documents with respect to which the annotations were received.

* * * * *